United States Patent [19]

Richter et al.

[11] 4,220,231
[45] Sep. 2, 1980

[54] DRIVE MECHANISM

[75] Inventors: Gerhard Richter, Wuppertal; Klaus Stein, Velbert, both of Fed. Rep. of Germany

[73] Assignee: Vorwerk & Co Interholding GmBH, Wuppertal, Fed. Rep. of Germany

[21] Appl. No.: 949,053

[22] Filed: Oct. 6, 1978

[30] Foreign Application Priority Data

Oct. 6, 1977 [DE] Fed. Rep. of Germany ....... 2744929

[51] Int. Cl.³ ............................................. F16D 43/25
[52] U.S. Cl. .................................. 192/82 T; 192/89 B
[58] Field of Search ............................ 192/82 T, 89 B

[56] References Cited

U.S. PATENT DOCUMENTS

| 2,503,262 | 4/1950 | Hall | 192/82 T |
|---|---|---|---|
| 2,570,515 | 10/1951 | Bonham | 192/82 T |
| 3,261,230 | 7/1966 | Rudnicki | 192/82 T |
| 3,382,852 | 5/1968 | Lorean | 192/82 T X |
| 3,640,363 | 2/1972 | Spalding | 192/89 B X |
| 3,730,151 | 5/1973 | Smith et al. | 192/82 T X |
| 3,913,713 | 10/1975 | F'Geppert | 192/82 T X |
| 4,108,424 | 8/1978 | Rizzo | 192/82 T X |

*Primary Examiner*—Allan D. Herrmann
*Attorney, Agent, or Firm*—Michael J. Striker

[57] ABSTRACT

A drive mechanism, particularly for household appliances, includes a driving element, a driven element and a frictional clutch coupling for frictionally transmitting motion between these two elements. The coupling includes a dished spring fixedly connected to one of these elements and frictionally engaging the other of these elements, whereby normally transmit motion between these elements. The spring is of a material which deforms upon heating so that relative motion between these elements resulting in frictional heating of the dished spring causes the same to deform out of engagement with the other element and thereby interrupt the transmission of motion between the elements.

12 Claims, 4 Drawing Figures

DRIVE MECHANISM

BACKGROUND OF THE INVENTION

The present invention relates to drive mechanisms. More particularly, the present invention concerns belt drive mechanisms for household appliances and floor treating devices having electrical motor driving means.

It is known in the prior art to provide a driving mechanism with an arrangement for transmitting motion from the driving element, for example the output shaft of the motor, onto the driven element, for example a belt drive. It is also known to provide such a transmitting arrangement (see German Pat. No. 23 12 636) with a break coupling which operates as a function of the load acting on the driven element. When this load exceeds, for one reason or another, a predetermined level the break coupling interrupts the transmission of motion between driving and driven elements. The break coupling can be arranged as a temperature-dependent friction clutch coupling. Such a coupling is provided with a bimetallic spring (bimetallic springs are well known per se) fixedly connected to one of these elements and frictionally engaging the other of said elements whereby to normally transmit motion between them. Usually, the driving and driven elements are arranged concentric with each other and the spring is located in the space between them. The relative motion between the elements results in frictional heating of the spring which causes the same to deform in a predetermined direction out of frictional engagement so as to interrupt the transmission of motion between the driving and driven elements.

Because of their shape the known drive mechanisms with the break coupling, though advantageous on the whole, cannot meet certain structural requirements as to overall dimensions.

For example, a certain space has to be produced for the bimetallic spring upon its heat deformation. On the other hand, the spring has to be relatively big to ensure enough spring force for transmitting motion between the driving and driven elements. Therefore, the hollow drive casing has to have certain interior dimensions in order to accommodate therein a required spring without making the same too small. On the other hand, it leads to excessively big overall dimensions of the drive mechanisms, which fact is certainly negative for any household appliance.

It has been recognized that the known break couplings are not satisfactory with respect to the requirements made as to compactness and small space consuming. Thus, for example, it is especially inconvenient to accommodate such a break coupling in carpet treating devices which must have a very low overall height to be able to move underneath articles of furniture.

SUMMARY OF THE INVENTION

It is a general object of the present invention to avoid the disadvantages of the prior art.

More particularly, it is an object of the present invention to provide a drive arrangement of the type in question which can be accommodated in a very short housing.

In pursuance of these objects and others which will become apparent hereafter, one feature of the present invention resides in providing a driving element and a driven element concentric with the driving element, with means for frictionally transmitting motion between said elements and comprising a dished spring fixedly connected to one of said elements (for example, the driven element) and frictionally engaging the other of said elements whereby to normally transmit motion between said elements. The spring is of material which deforms upon heating so that relative motion between said elements resulting in frictional heating of said dished spring causes the same to deform out of engagement with said other element and thereby to interrupt the transmission of motion between the elements.

Another advantageous feature of the present invention is to make the outer diameter of the dished spring from 20 to 50 times larger than the thickness of the same. Moreover, it is also advantageous to make the outer diameter of the dished spring 2 to 5 times larger than the diameter of the central hole of the same. Such a break coupling having the above-mentioned dimensions can be accommodated in very short and small housings. For example, such a break coupling can be very easily installed in modern electrical carpet treating arrangements such as vacuum cleaners or the like, which have quite small housings. It thus becomes possible to provide a floor treating device with low-torque high-speed temperature-responsive couplings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
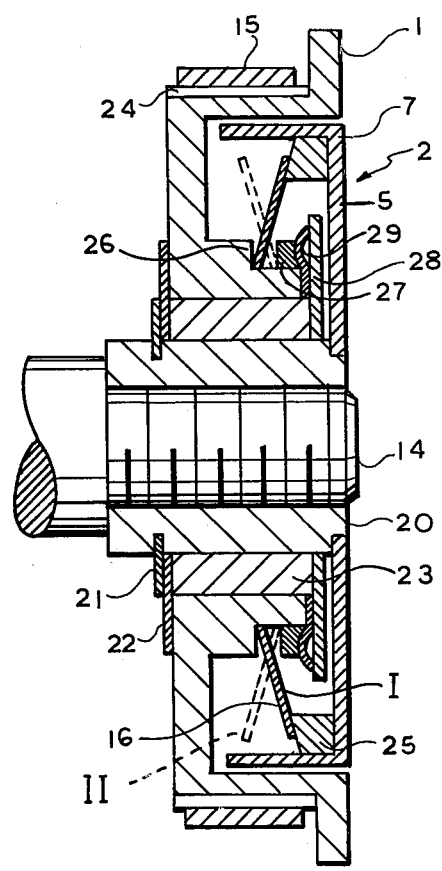
FIG. 1 is a longitudinal sectional view of a first embodiment of a drive mechanism in accordance with the present invention.

Referring now to the drawings, and first to FIG. 1 thereof, it may be seen that the reference numeral 14 designates an end portion of a driven shaft of a washing tool 3 (not shown). The shaft end portion 14 is provided with a friction clutch coupling designated in toto by the reference numeral 2. The end portion 14 is also provided with a housing 1 which rotates with it.

A sleeve 20 is fixedly mounted (i.e. threaded) on the end portion 14. A braking drum 5 is fixedly installed on the sleeve 20 for rotation therewith. The sleeve 20 is further provided with a holding ring 21 (i.e. a circlip) and a spacer ring 22, which are spaced axially along the sleeve 20 from the drum 5. The ring 22 and the drum 5 define therebetween a space for receiving therein a bush 23 of sintered metal. The bush 23 is mounted on the sleeve 20 for rotation relative thereto. The hollow housing 1 is fixedly mounted on the bush 23 for rotation therewith. The casing 1 has an annular flange 24 operative for supporting on its outer surface a belt 15, preferably a timing belt. The flange 24 overlaps a collar of the drum 5 which is provided with a friction member 25 of, e.g. rubber below the collar 7. A dished spring 16 is fixedly mounted to the casing 1 between a shoulder 26 of the same and a retaining ring 27 for rotation with the casing 1. The sleeve 20 is provided with an abutment ring 28 located between the bush 23 and the drum 5. A spring 29 is installed between the ring 28 and the ring 27.

When the friction clutch coupling 2 is in action, the dished spring 16 frictionally engages the friction member 25 (see position I). Thus the spring 16 provides a force-locking (i.e. frictional) connection between the casing 1 and the drum 5 which is fixedly mounted on the shaft end portion 14. When the drive belt 15 is rotated via not illustrated driving means, the dished spring 16 will transmit motion to the friction member 25 and further via the drum 5 and the sleeve 20 to the shaft end portion 14. If, during operation, the tool 3 and hence the shaft with the end portion 14 are blocked against rotation, the spring 16 slides along the friction member 25 and then becomes frictionally heated. The spring 16 is made of a material which deforms upon heating, for example of bimetallic material. Thus, upon heating to a certain extent the spring 16 deforms almost instantaneously out of engagement with the friction member 25 and assumes position II thus suddenly interrupting the transmission of motion between the housing 1 and the shaft end portion 14. It is to be understood that the degree of spring deformation depends upon the mutual relationship between the corresponding dimensions outer diameter, thickness and inner diameter of the central hole of this dished spring 16. From this moment the spring flips into the position II the housing 1 can rotate on the bush 23 relative to the sleeve 20 and the shaft end portion 14 without transmitting any motion thereto.

Figure 2:
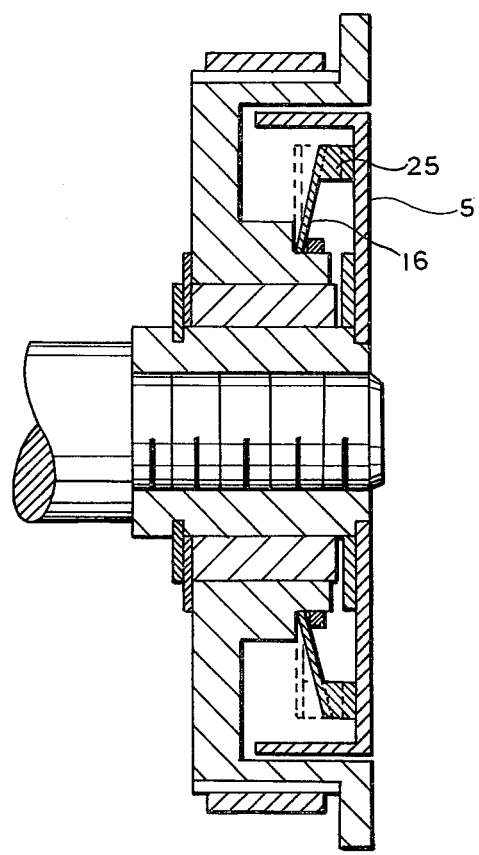
FIG. 2 is a longitudinal sectional view of a second embodiment of the drive mechanism.

FIG. 2 shows generally the same construction of the drive mechanism as that shown in FIG. 1. However, the friction member 25 is here provided on the spring 16 rather than on the drum 5 as in the case of the embodiment shown in FIG. 1. Besides that the embodiment shown in FIG. 2 does not have the spring 29. In other respects, the parts of the second embodiment are and function the same as in the embodiment shown in FIG. 1.

Figure 4:
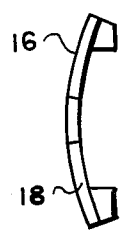
FIG. 4 is a fragmentary sectional view of the dished spring shown in FIG. 2.
Figure 3:
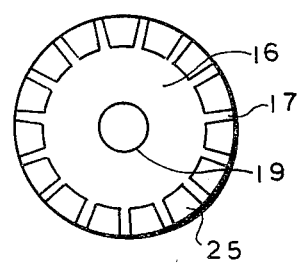
FIG. 3 is a top view of a dished spring employed in the second embodiment shown in FIG. 2.

One possible embodiment of the dished spring 16 is shown in FIGS. 3 and 4. The friction member 25 is installed on the dished spring 16 and is divided in a mumber of separate segments. In accordance with the present invention the dished spring has an outer diameter 17 which is 3 to 5 times larger than the diameter of the central hole 19.

The thickness of the spring 16 (see FIG. 4) may be 20 to 50 times smaller than the outer diameter 17 of the same (see FIG. 3).

It will be understood that each of the elements described above, or two or more together, may also find a useful application in other types of drive mechanisms differing from the types described above.

While the invention has been illustrated and described as embodied in a drive mechanism, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive mechanism, particularly for household appliances, comprising a driving element; a driven element concentric with said driving element; and means for frictionally transmitting motion between said elements, comprising a dished spring fixedly connected to one of said elements and in direct frictional contact therewith the other of said elements whereby to normally transmit motion directly between said elements, said spring being of a material which deforms upon heating so that relative motion between said elements resulting in direct frictional heating of said dished spring causes the same to deform abruptly out of engagement with said other element and thereby interrupt the transmission of motion between the elements.

2. A mechanism as defined in claim 1, wherein said dished spring is of metallic material.

3. A mechanism as defined in claim 2, wherein said dished spring is of bimetallic material.

4. A mechanism as defined in claim 3, wherein said dished spring has an outer diameter 20 to 50 times larger than the thickness of the spring.

5. A mechanism as defined in claim 4, wherein said dished spring has a central hole for installing said spring on a corresponding portion of said one of said elements.

6. A mechanism as defined in claim 5, wherein said dished spring has an outer diameter which is 3 to 5 times larger than the corresponding inner diameter of said central hole.

7. A mechanism as defined in claim 1, wherein said means further comprise a cylinder rigidly connected to said other of said elements for rotation therewith and frictionally engaged with said dished spring.

8. A mechanism as defined in claim 1, wherein said one element is located on said other element for rotation therewith when said dished spring frictionally engages said cylinder and for rotation relative thereto when said dished spring deforms out of engagement with said cylinder without transmission of motion between the elements.

9. A mechanism as defined in claim 1, wherein said one element is further provided with a belt drive.

10. A mechanism as defined in claim 1; and further comprising a friction-promoting element on one of said spring and said other element, respectively, and in frictional engagement with the other of said spring and other element when said means transmits motion between said driving and driven elements.

11. A mechanism as defined in claim 10, wherein said friction-promoting element is of annular configuration.

12. A mechanism as defined in claim 10, wherein said friction-promoting element is composed of an annulus of discrete sections of friction-promoting material.

* * * * *